Figure 1:
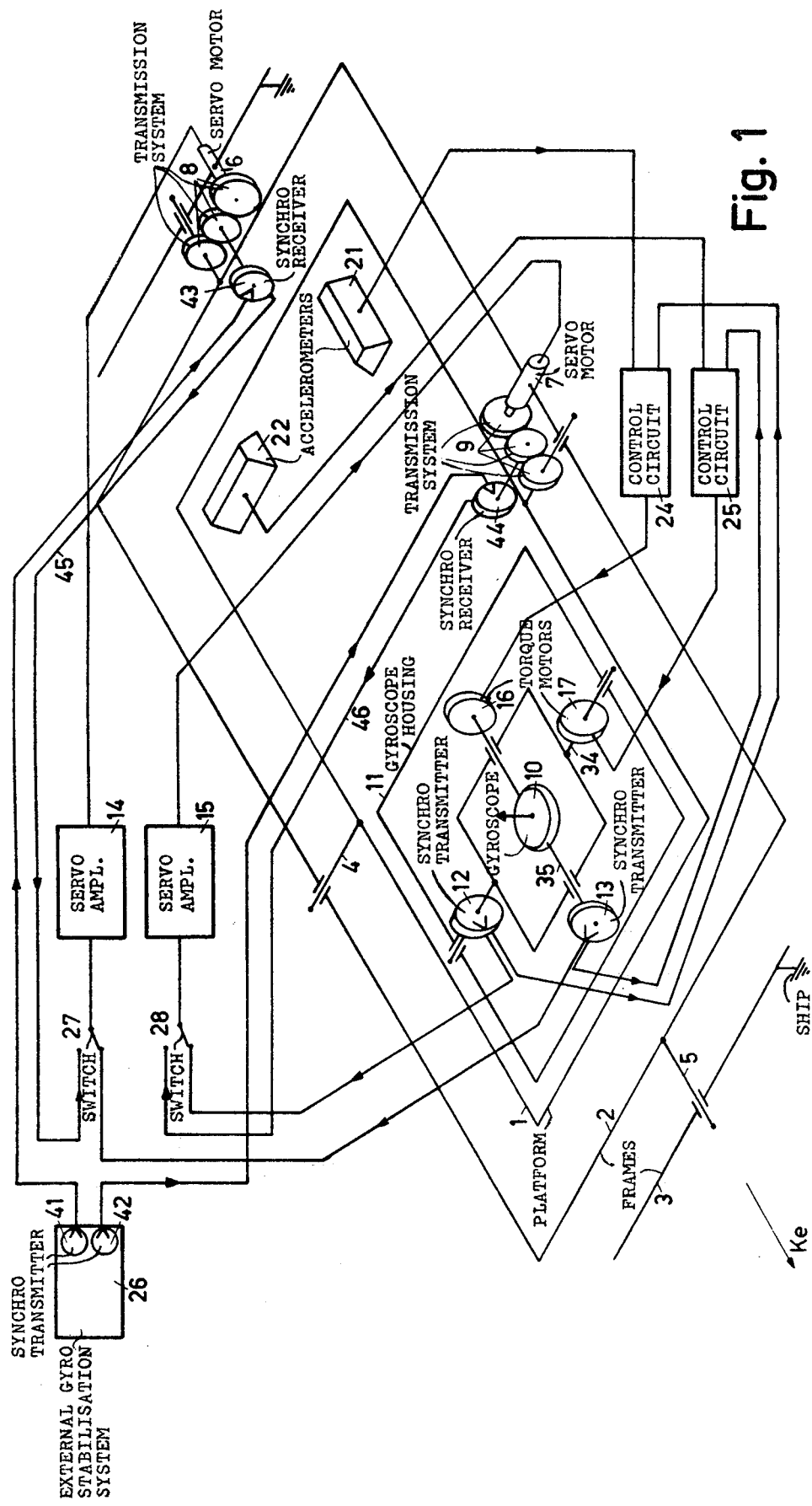

United States Patent [19]
Bos

[11] 3,936,716
[45] Feb. 3, 1976

[54] STABILISATION SYSTEM

[75] Inventor: Johannes Bos, Hengelo, Netherlands

[73] Assignee: U.S. Philips Corporation, New York, N.Y.

[22] Filed: Nov. 28, 1973

[21] Appl. No.: 419,684

Related U.S. Application Data

[63] Continuation of Ser. No. 200,921, Nov. 22, 1971, abandoned.

[52] U.S. Cl................................. 318/591; 318/649
[51] Int. Cl.² ........................................... G05B 7/00
[58] Field of Search.................... 318/591, 648, 649

[56] References Cited
UNITED STATES PATENTS

| | | | |
|---|---|---|---|
| 2,382,993 | 8/1945 | Haskins, Jr. .................. | 318/591 X |
| 2,463,687 | 3/1949 | Gittens............................ | 318/649 |
| 2,531,826 | 11/1950 | Reichel........................... | 318/649 X |
| 2,634,391 | 4/1953 | Rusler............................. | 318/591 |
| 2,649,564 | 8/1953 | Meredith ........................ | 318/591 |
| 2,944,426 | 7/1960 | Amara............................. | 318/649 X |
| 3,182,244 | 5/1965 | Fitzroy, Jr. et al. ............. | 318/591 |
| 3,237,313 | 3/1966 | Gevas ............................. | 318/649 X |
| 3,330,945 | 7/1967 | Gevas ............................. | 318/649 X |
| 3,471,108 | 10/1969 | Corso.............................. | 318/649 X |
| 3,510,092 | 5/1970 | Hendrick et al. ............... | 318/591 X |

*Primary Examiner*—B. Dobeck
*Attorney, Agent, or Firm*—Frank R. Trifari; Ronald L. Drumheller

[57] ABSTRACT

In a stabilisation system a platform is stabilised about two perpendicular axes by means of a gyro-controlled servo system. The vertical gyro being used in the stabilisation system is cardanic suspended in a gyro housing mounted on said platform. In a first step the spin axis of the vertical gyro is brought, to some extent, from a random orientation to a position vertical with respect to the earth surface by means of two synchro transmitters coupled to the gyro, first control circuits connected to each of these synchro transmitters, and two torque motors, and in a second step the vertical gyro is held in said vertical position by means of two accelerometers mounted on the platform to be stabilised, second control circuits connected to each of these accelerometers, and the abovementioned torque motors.

10 Claims, 2 Drawing Figures

STABILISATION SYSTEM

This is a continuation of application Ser. No. 200,921, filed Nov. 22, 1971, now abandoned.

The invention relates to a stabilisation system, e.g. for a naval radar installation, whereby a gyro housing, which contains a vertical gyro in a cardanic suspension, is mounted on a platform to be stabilised and whereby said platform is stabilised about two perpendicular axes by means of at least two concentric cardan frames and a gyro-controlled servo system.

A similar system is described in the U.S. Pat. No. 3,358,285. However, before the stabilisation process there described can take place, the spin axis of the vertical gyro must, to some extent, be brought from a random position to a position vertical with respect to the earth surface. Also, in addition to the difficulties caused by this run-up process, the situation may arise that the platform is already stabilised externally through a ship's gyro situated near the centre of the ship, but that the stabilisation process is to be continued at a certain moment by use of the above-mentioned vertical gyro, while the spin axis of this gyro will generally be in a random position.

Hence, the object of the invention is to provide a stabilisation system of the type described in the opening paragraph, in which the process wherein the spin axis of the vertical gyro is brought to a position vertical with respect to the earth surface and the following platform stabilisation whereby the spin axis of the gyro must be held in said vertical position, is realised in a very simple way in one and the same system operating in two steps, the first step operating in two modes, in which steps and modes the same elements are used as much as possible.

According to the invention, in a first step, the spin axis of the vertical gyro, is brought, to some extent, from a random orientation to a position vertical with respect to the earth surface by means of two synchro transmitters coupled to the gyro, first control circuits connected to each of these synchro transmitters, and two torque motors connected to a corresponding first control circuit, each of said first control circuit is composed successively of a demodulator, a compensation network and a matching amplifier, and in a second step, the spin axis of the the vertical gyro is held in said vertical position, in a known manner, by means of two accelerometers mounted on the platform to be stabilised, second control circuits connected to each of these accelerometers and the above-mentioned torque motors, whereby each of said second control circuit is composed successively of a filter, the compensation network and the matching amplifier.

The invention will now be further explained with the aid of the figures, of which:

FIG. 1 gives a schematic representation of the stabilisation system, while

Figure 2:
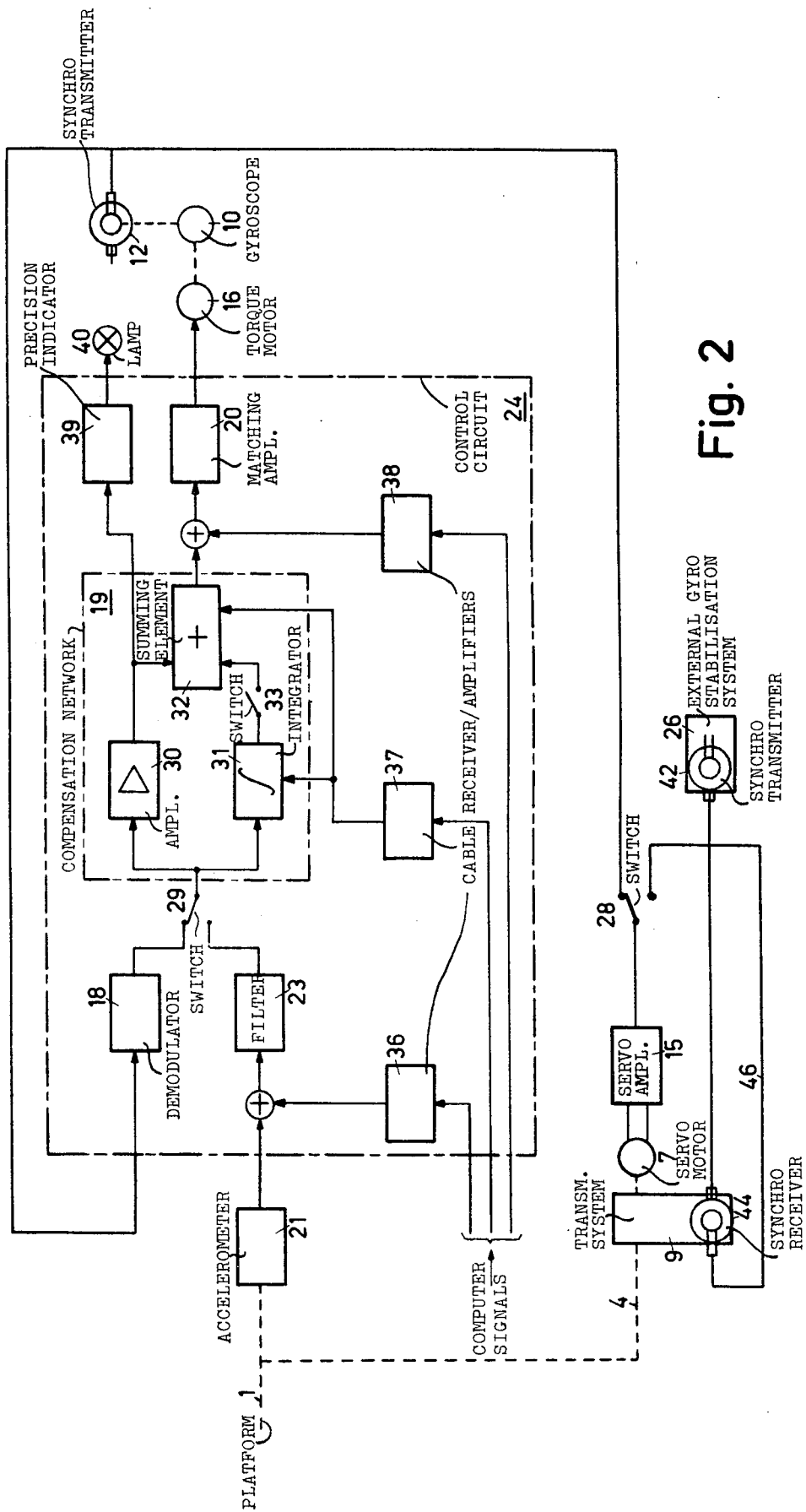

FIG. 2 illustrates in more detail that part of the stabilisation system which effects the stabilisation about one of the axes pertaining to the system.

Like parts in both figures are denoted by like reference numerals.

The numeral 1 in FIG. 1 represents a platform to be stabilised. For this purpose this platform is in a cardanic suspension by means of two concentric gimbal frames 2 and 3 and two corresponding co-planar orthogonal shafts 4 and 5, respectively. If the platform to be stabilised is on board a ship, then the inner gimbal frame 2 is bearing-mounted in the gimbal frame 3, which is fixed to the ship, through the shaft 5, as customary, parallel to the ship's fore-and-aft line.

The inner gimbal frame 2 carries two servo motors 6 and 7. Through intervention of the transmission systems 8 and 9 respectively, these servo motors, by correct activation, can tilt the platform 1 to be stabilised in such a way that this platform is held in a certain fixed position with respect to an earth-fixed reference.

A gyroscope 10 serves as such a reference, said gyroscope is in a cardanic suspension in a gyroscope housing 11 mounted on the platform to be stabilised. A construction in which the gyroscope housings are connected direct with the platform to be stabilised has the advantage that the ship's deformations due to the roll and pitch movements do not influence the stabilisation. If the inaccuracies resulting from these deformations are of little significance or are corrected in another way, the gyroscope of the platform to be stabilised may be simply set up at a remote position, for instance more closely to the meta-centre of the ship. In the first case this is known as local stabilisation, in the latter case as external stabilisation. The gyroscope 10, also called vertical gyro, contains a spin axis, which, in case the gyroscope has taken the desired orientation, is exactly vertical with respect to the earth surface. The vertical gyro 10 provides two misalignment voltages through the synchro transmitters (pickoffs) 12 and 13 connected to this gyro as soon as the gyroscope housing and, hence, the platform are taken from the zero position determined by the vertical spin axis of the vertical gyro. These misalignment voltages are then fed, via the servo amplifiers 15 and 14, respectively to the servo motors 7 and 6 which, consequently, tilt the platform to be stabilised in such a way that these misalignment voltages are reduced to the zero value. In this way the platform is stabilised about the shafts 4, 5 by the servo systems (13, 14, 6, 8), (12, 15, 7, 9), controlled by the vertical gyro 10.

Although hereby the spin axis of the vertical gyro 10 is kept in a vertical position by means of the gyro control devices used, the spin axis of the gyro must previously have been brought, to some extent, from a random position to said vertical position.

According to the invention, in a first step, the spin axis of the vertical gyro 10 is brought, to some extent, from a random orientation to a position vertical with respect to the earth surface by means of the above mentioned synchro transmitters 12 and 13, first control circuits connected to each of these synchros, and two torque motors 16 and 17 connected to a corresponding first control circuit, whereby each of the first control circuits is composed successively of a demodulator, a compensation network, and a matching amplifier, which are indicated in FIG. 2 by 18, 19 and 20 respectively, and in a second step, the spin axis of the vertical gyro 10 is held in said vertical position, in a known manner, by means of two accelerometers 21 and 22 respectively, which are mounted on the platform to be stabilised, second control circuits connected with each of these accelerometers and the above-mentioned torque motors 16 and 17, whereby each of the second control circuits is composed successively of the filter indicated in FIG. 2 by 23, the compensation network 19 and the matching amplifier 20. The gyro drive circuits, of which each is formed by a combination of a first and a second control circuit, are indicated by 24 and 25 respectively.

There are two modes in which the first step of the stabilisation process can occur, viz.:

1. during external stabilisation; in that case the platform stabilisation takes place by means of a ship's gyro e.g. situated in the metacentre of the ship. The position of the platform 1 to be externally stabilised is compared with the reference position indicated by the external gyro stabilisation system 26 by means of two synchro transmitters 41 and 42, which are at the output of the external gyro stabilisation system 26, and synchro receivers 43 and 44 connected to each of the transmission systems 8 and 9 respectively. If the position of the platform 1 does not correspond to this reference position, then the synchro receivers 43 and 44 provide control voltages which are fed respectively to the servo motors 6 and 7 via the conductors 45 and 46 and the servo amplifiers 14 and 15. Hereby, the switches indicated in FIG. 1 by 27 and 28 are in the position which is not indicated. In order to easily switch from this external stabilisation to local stabilisation, i.e. stabilisation using a gyro suspended in a housing mounted on the platform to be stabilised, the spin axis of the vertical gyro must be brought to the vertical position, i.e. aligned with the externally stabilised platform within a defined limit of accuracy. To this effect the vertical gyro is controlled in this first mode by the externally stabilised platform by means of the synchro transmitters 12 and 13 coupled to the gyro itself, the gyro drive circuits 24 and 25 connected to each of these synchro's, and the torque motors 16 and 17. It should also be noted that external stabilisation can also be obtained by coupling the platform to be stabilised (locally) to another stabilised platform, so that the movements of the latter platform are followed slavishly;

2. in the second mode of the first step the movements of the platform relative to the ship are arrested. Similar to the first mode of the first step, the spin axis of the gyro 10 must be brought, to some extent, from a random orientation to a position vertical with respect to the earth surface by means of the synchro transmitters 12 and 13, the gyro drive circuits 24 and 25 and the torque motors 16 and 17. Since in this situation the platform is not stabilised, the vertical gyro is brought to the vertical position with a greater inaccuracy than in the first mode. However, this does not raise any objections because in the second step the spin axis of the vertical gyro is kept in an exactly vertical position by means of accelerometers.

So, it can be seen that in the two modes the spin axis of the vertical gyro is brought, to some extent, to the vertical position and in the two modes the gyro is controlled by the platform; in the first mode by the externally stabilised platform and in the second mode by the platform, the movements of which relative to the ship are arrested.

The stabilisation system is switched from the first into the second step when, in the first mode, the spin axis of the gyro has been either aligned with the externally stabilised platform or has been placed into a practically vertical position in the second mode. Switching from the first mode of the first step to the second step occurs when a precision indicator shows that the spin axis of the gyro has been aligned with the externally stabilised platform. Switching from the second mode of the first step to the second step occurs upon the expiration of a predetermined time.

In the following the part of the stabilisation system that effects the stabilisation about the shaft 4 will now be further described with reference to FIG. 2.

During the external stabilisation (the first mode of the first step) the switch 28 in FIG. 2 is in the position which is not indicated. In this position the position of the platform is compared with the reference indicated by the external gyro stabilisation system 26 by means of the synchro transmission system 42, 44. If the two positions do not correspond to one another, then the synchro receiver 44 emits a control signal, which is fed to the motor 7 via the conductor 46 and the servo amplifier 15. If no external stabilisation takes place, the switch 28 is in the indicated position and the servo system formed by the amplifier 15 and the motor 7 is controlled by the synchro transmitter 12; during the second mode of the first step, however, the platform remains blocked.

The switch 29 is in the indicated position in the two modes of the first step. The vertical gyro 10 is then followed up through the synchro 12, the demodulator 18, the compensation network 19, the matching amplifier 20 and the torque motor 16. If the stabilisation system occurs in the second step, the vertical gyro is followed up through the accelerometer 21, the filter 23, the compensation network 19, the matching amplifier 20 and the torque motor 16.

Now, if it is assumed that the platform is controlled by the vertical gyro, but the spin axis of the gyro is not in an exactly vertical position, so that the platform shows an almost similar deviation from a horizontal plane, e.g. a deviation corresponding with an angular rotation $\theta_i$ of the platform about the shaft indicated in FIG. 1 by 4, the accelerometer 21 produces a voltage $$e = K_1(g\,\theta_i + a)$$

where $g$ represents the gravitational acceleration, $a$ an interfering acceleration due to a movement of the ship and $K_1$ a constant. The signal provided by the accelerometer is thus built up from two components, viz.: a component which is a measure for the skew of the platform and a signal varying in amplitude (â) and frequency ($\omega_s$) due to the movement of the ship. The latter signal may be given by $$K_1\,a = K_1\,\hat{a}\,\sin\omega_s t,$$

where $\omega_s$ is the frequency of the pitching movement of the ship. The signal provided by the accelerometer is fed to the filter 23. The purpose of this filter is to provide ample damping for the ship's frequencies ($\omega_s$), whose magnitudes are in the order of 0.5 to 1.25 rad/sec. For this purpose a low-pass filter has been chosen. The dimensions of this filter are such that if F represents the transfer function of the filter, F is approximately equal to 1 for frequency values $\omega \ll 0.12$ rad/sec and a damping of 30 dB/oct. occurs for frequency values $\omega'' > 0.12$ rad/sec. In view of this filter characteristic, the signal provided by the filter may now be expressed by:

$$K_1\,g\,\theta_i.$$

This signal is fed to the compensation network 19. This network is composed of an amplifier 30, an integrator 31 and a summing element 32. A switch is provided between the integrator and the summing element; however, this switch is closed when the stabilisation process is taking place in the second step. If the transfer function of the compensation network is now given by $$a_1 + \frac{a_2}{s}$$

then the signal provided by this network and fed to the matching amplifier 20 is represented by $$K_1 g \theta_i \left(a_1 + \frac{a_2}{s}\right).$$

Due to the fact that a 400 Hz pancake motor is used for the torque motor 16, the matching amplifier 20 functions as modulator. If $K_2$ represents the d.c. amplification of this modulator and $K_3$ the transfer function of the pancake motor, the torque exerted on the gyro is expressed by $$K_1 g \theta_i \left(a_1 + \frac{a_2}{s}\right) K_2 K_3$$

or $$C_1 \left(1 + \frac{C_2}{s\tau}\right) \theta_i$$

where $C_1$ and $C_2$ are constants and $\tau$ the RC time of the integrator 31 pertaining to the compensation network. Since the transfer function of the gyro may be expressed by $C_3/s$, the angle through which the gyro is turned is given by $$\theta_o = \left(1 + \frac{C_2}{s\tau}\right) \frac{1}{s\tau_1} \theta_i$$

where $\tau_1 = 1/C_1 C_3$ represents the time constant of the erection loop formed by the accelerometer, the gyro drive circuit and the pancake motor.

If it is now assumed that no spurious torques are exerted on the gyro and the spin axis of the gyro had turned about the shaft 34 through the same angle $\theta_i$ as the platform about the shaft 4, then the term $C_1 \theta_i$ in the expression $$C_1 \left(1 + \frac{C_2}{s\tau}\right) \theta_i$$

represents the torque that must be exerted on the gyro in order to bring this gyro in the desired vertical position (compare: Savet - Gyroscopes: Theory and Design, Section 3–4).

If now an unbalance occurs in the gyro, for instance about the shaft indicated in FIG. 1 by 34, then the resulting torsional unbalance produces a motion of precession about the shaft indicated in FIG. 1 by 35. In order to eliminate this ever-increasing angular displacement, an increasing torque should be exerted on the shaft 34. To this effect an integration, which is proportional to the unbalance occurring in the gyro, is carried out on the control torque or on a value proportional to this, such as, in the case considered, on the filtered signal from the accelerometer. Hence, the term $$\frac{C_1 C_2}{s\tau} \theta_i$$

in the last-mentioned expression represents the unbalance compensation.

As regards the integration constants $\tau$ and $\tau_1$ it may be noted that $\tau/C_2 >> \tau_1$, in order that the control determining the vertical position is not too strongly influenced by the unbalance compensation (compare: Savet - Gyroscopes: Theory and Design, Section 6–5). The integrator 31 is designed so that it has a diminished time constant $\tau$ if the input voltage of the integrator exceeds a certain value. This implies that, as long as the gyro position has not yet approached the vertical position within a certain limit of accuracy, it is of little importance that the unbalance compensation influences the control determining the desired vertical position, while, on the other hand, the delayed effect on the gyro control is reduced.

In addition to the above-mentioned unbalance compensation, an own course and speed compensation and a compensation for the earth's rotation can be provided in the gyro control.

The accelerometer 21 is sensitive to an increase in the speed of the ship. For the compensation of the resulting error in the signal from the accelerometer, a correction signal calculated by a computer, called Ve compensation (Ve = own speed of the ship), together with the signal from the accelerometer 21 is fed to the filter 23 via the cable receiver/amplifier 36 (compare: Savet — Gyroscopes: Theory and Design, Section 6–12)

The accelerometer 22 is sensitive to a centrifugal acceleration which results from a change in the own course of the ship. For the compensation of the resulting error in the signal from the accelerometer, a correction signal calculated by the computer, called $\check{K}e.Ve$ compensation (ke = own course of the ship), together with the signal from the accelerometer 22 is fed to the respective filter via a cable receiver/amplifier (compare: Savet - Gyroscopes: Theory and Design, Section 6–13). If the ship's heading is suddenly changed, an inaccuracy in the $\check{K}e.Ve$ compensation may occur and this may result in serious stabilisation errors. These errors may be reduced by switching the stabilisation system in a "free drift" mode. This switching is implemented by the computer which, to this effect, provides the integrator 31 and the summing element 32 with a signal via the cable receiver/amplifier 37. The integrator and the summing element are both provided with a hold circuit. The output voltage of the integrator and the summing element is kept constant in the free drift mode through these hold circuits, and the gyro control is not influenced anymore by undesired accelerations. In the free drift mode the $\check{K}e.Ve$ compensation can be left out.

Finally, the compensation for the earth's rotation is also computer-determined and, together with the signal from the compensation network 19, is fed to the modulator 20, via the cable receiver/amplifier 38 (compare: Savet - Gyroscopes: Theory and Design, Section 6–4).

As previously mentioned, the gyro is followed up via the synchro 12, the demodulator 18, the compensation network 19, the modulator 20 and the pancake motor 16 in the first and in the second mode of the first step. In case external stabilisation is taking place (i.e. in the first mode of the first step), a precision indicator 39 and the lamp 40, the indicator being connected to the output of the amplifier 30 pertaining to the compensation network, indicate that the spin axis of the gyro is brought to the vertical position, i.e. aligned with the platform within a defined limit of accuracy and can be switched manually from the first mode of the first step to the second step. It should also be noted that the switch 33 between the integrator 31 and the summing element 32 is in the open (indicated) position during the second mode of the first step. During this mode the movements of the platform is blocked relative to the ship, and the spin axis of the gyro is only brought in an orientation approaching the vertical position, through which an unbalance compensation which would exercise a retarding influence on the gyro control in the second mode of the first step, can be left out. Upon the expiration of a time to be predetermined a switch is made automatically from the second mode of the first step to the second step, at the same time the switch 33 is being closed.

I claim:

1. A stabilisation system for a naval radar installation whereby a gyro housing, which contains a vertical gyro in a cardanic suspension, is mounted on a platform to be stabilised, which is cardanically suspended by means of two concentric gimbal frames and stabilised about two corresponding co-planar orthogonal shafts, the stabilisation about each of said shafts occurring by a servo system controlled by said gyro, wherein, in a first step, the spin axis of the vertical gyro is brought, to some extent, from a random orientation to a position vertical with respect to the earth surface by means of two synchro transmitters coupled to the gyro, first control circuits connected to each of these synchro transmitters, and two torque motors connected to a corresponding first control circuit, whereby each of said first control circuits is composed successively of a demodulator, a compensation network and a matching amplifier, and in a second step the vertical gyro is held in said vertical position in a known manner, by means of two accelerometers mounted on the platform to be stabilised, second control circuits connected to each of these accelerometers, and the above-mentioned torque motors, whereby each of said second control circuits is composed successively of a filter, the compensation network and the matching amplifier.

2. A stabilisation system as claimed in claim 1, wherein, if in the first step the platform is externally stabilised by means of a ship's gyro, which may be situated in the ship's metacentre, and the orientation of the spin axis of the vertical gyro is brought to the position vertical with respect to the earth surface, which is the position corresponding with the position of the externally stabilised platform within a defined limit of accuracy, the second step of the stabilisation process is started, whereby said external platform stabilisation is switched to the local platform stabilisation which is controlled by the vertical gyro.

3. A stabilisation system as claimed in claim 1, wherein, upon the expiration of a predetermined time, being the duration of the first step, during which time the spin axis of the vertical gyro can run in to the orientation, vertical with respect to the earth surface, the platform, whose movements relative to the ship were arrested during that time, is released, thus starting the second step of the stabilisation process.

4. A stabilisation system as claimed in claim 1, wherein, during the second step, said filter is fed, on the one hand, with a signal which is derived from one of the accelerometers and is a measure for the skew of the spin axis of the vertical gyro relative to the desired vertical orientation and, on the other hand, with a computer-determined ship's course and speed correction, said filter being designed as a low-pass filter such that frequency components due to the movements of the ship and present in the signal from the respective accelerometer are suppressed.

5. A stabilisation system as claimed in claim 4, wherein the compensation network is formed by an amplifier and an integrator, which are both connected to the demodulator in the first step and to said filter in the second step, and by a summing element through which the output signals of the amplifier and the integrator are fed to the matching amplifier functioning as modulator, whereby the compensation network is also provided with the two hold circuits which form a part of the integrator and the summing element respectively and keep the output voltage of both constant during the computer-determined time intervals during which the ship's heading is suddenly changed.

6. A stabilisation system as claimed in claim 5, wherein the signal fed to the matching amplifier, is formed by the output signal of the compensation network and a computerdetermined compensation for the earth's rotation.

7. A stabilisation system as claimed in claim 3, wherein a switch is provided between the integrator and the summing element, said switch blocking the integrator output during the time to be predetermined, while the stabilisation system is in the second mode of the first step.

8. A system for horizontally stabilising a platform which is cardanically mounted on a ship and free to rotate about two orthogonal axes, comprising:
 first and second accelerometers mounted on said platform for sensing inertial accelerations of said platform along said two orthogonal axes;
 a vertical gyro for holding a vertical reference, said vertical gyro being cardanically mounted on said platform and free to rotate about two axes that are parallel with said orthogonal axes;
 first and second synchros mounted along said two axes that are parallel with said orthogonal axes for sensing position differences between said platform and said gyro about said two axes;
 first and second torque motors mounted along said two axes that are parallel with said orthogonal axes for controlling the relative position of said gyro with respect to said platform about said two axes;
 first and second drive circuits normally responsive to the accelerations sensed by said accelerometers for driving said first and second torque motors in directions which tend to reduce the accelerations sensed by said accelerometers but during run-up of said gyro responsive instead to the position differences sensed by said first and second synchros for driving said first and second torque motors in directions which tend to reduce the position differences sensed by said first and second synchros;
 third and fourth torque motors mounted along said orthogonal axes for controlling the relative position of said platform with respect to said ship about said orthogonal axes; and third and fourth drive circuits responsive to the position differences sensed by said first and second synchros, when said first and second drive circuits are responsive to the accelerations sensed by said accelerometers, for driving said third and fourth torque motors in the directions which tend to reduce the position differences sensed by said first and second synchros, whereby said vertical gyro is normally maintained in a vertical position by said accelerometers mounted on said platform and said platform is slaved to said vertical gyro, but during run-up said vertical gyro is erected using the same components by instead slaving said vertical gyro to said platform.

9. A system as defined in claim 8, wherein said platform is fixed in position relative to said ship during run-up of said vertical gyro.

10. A system as defined in claim 8, and further comprising:

a source of external stabilisation signals indicative of the position differences that a stabilised platform would have with respect to said ship about said orthogonal axes; and third and fourth synchros mounted along said orthogonal axes for sensing the amounts by which the actual position differences between said platform and said ship about said orthogonal axes deviate from the position differences indicated by stabilisation signals from said source, said third and fourth drive circuits being responsive to said amounts during run-up of said gyro for driving said third and fourth torque motors in directions which tend to reduce said amounts, thereby externally stabilising said platform during run-up of said gyro.

* * * * *

UNITED STATES PATENT AND TRADEMARK OFFICE
CERTIFICATE OF CORRECTION

PATENT NO. : 3,936,716
DATED : February 3, 1976
INVENTOR(S) : JOHANNES BOS

It is certified that error appears in the above-identified patent and that said Letters Patent are hereby corrected as shown below:

After Section [21], it should read
--[30]   Foreign Application Priority Data
         Dutch   November 24, 1970.........7017134--

Column 1, line 43, after "circuit," insert --whereby--
Column 4, line 60, "values $\omega$" $> 0.12$ rad/sec." should be --values $\omega \gg 0.12$ rad/sec.--

Column 6, line 47, "-free drift"" should be --"free drift"--

Claim 6, line 4, "computerdetermined" should be --computerdetermined--

Signed and Sealed this

Fourteenth Day of December 1976

[SEAL]

Attest:

RUTH C. MASON
*Attesting Officer*

C. MARSHALL DANN
*Commissioner of Patents and Trademarks*